(12) United States Patent
Shaw et al.

(10) Patent No.: US 7,327,928 B2
(45) Date of Patent: Feb. 5, 2008

(54) GAS FILLED HOLLOW CORE CHALCOGENIDE PHOTONIC BANDGAP FIBER RAMAN DEVICE AND METHOD

(75) Inventors: Leslie Brandon Shaw, Woodbridge, VA (US); Jasbinder S Sanghera, Ashburn, VA (US); Ishwar D Aggarwal, Fairfax Station, VA (US); Peter A Thielen, Riverside, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/532,148

(22) Filed: Sep. 15, 2006

(65) Prior Publication Data

US 2007/0147757 A1 Jun. 28, 2007

Related U.S. Application Data

(62) Division of application No. 11/122,203, filed on May 3, 2005, now Pat. No. 7,283,712.

(51) Int. Cl.
*G02B 6/02* (2006.01)
*G02B 6/32* (2006.01)
*G02B 6/00* (2006.01)

(52) U.S. Cl. .................. 385/142; 385/125; 385/141
(58) Field of Classification Search ............ 385/123, 385/125–129, 141, 142
See application file for complete search history.

(56) References Cited

U.S. PATENT DOCUMENTS

| 6,526,782 | B1 | 3/2003 | Mossadegh et al. | 65/488 |
|---|---|---|---|---|
| 6,847,771 | B2 | 1/2005 | Fajardo et al. | 385/125 |
| 6,873,893 | B1 | 3/2005 | Sanghera et al. | 701/49 |
| 6,917,741 | B2 | 7/2005 | Fekety et al. | 385/125 |
| 6,928,227 | B2 | 8/2005 | Shaw et al. | 385/141 |
| 7,082,242 | B2 | 7/2006 | Fajardo et al. | 385/127 |
| 2001/0008363 | A1 | 7/2001 | Sanghera et al. | 313/496 |
| 2003/0161599 | A1 | 8/2003 | Broderick et al. | 385/123 |

(Continued)

OTHER PUBLICATIONS

Allan, D.C., West, J.A., Fajardo, J.C., Gallegher, M.T., Koch, K.W., Borrelli, N.F., "Photonic Crystal Fibers: Effective-Index and Band-Gap Guidance", Photonic Crystals and Light Localization in the 21st Century, edited by C. M. Soukoulis (Kluwer, Dordrecht, 2001), pp. 305-320.

(Continued)

*Primary Examiner*—Tina M. Wong
*Assistant Examiner*—Daniel J Petkovsek
(74) *Attorney, Agent, or Firm*—John J. Karasek; Sally A. Ferrett; George Kap

(57) ABSTRACT

A hollow core photonic bandgap chalcogenide glass fiber includes a hollow core for passing light therethrough, a Raman active gas disposed in said core, a microstructured region disposed around said core, and a solid region disposed around said microstructured region for providing structural integrity to said microstructured region. A coupler can introduce at least one light signal into the hollow core of the chalcogenide photonic bandgap fiber. The method includes the steps of introducing a light beam into a hollow core chalcogenide photonic bandgap glass fiber filled with a Raman active gas disposed in the core, conveying the beam through the core while it interacts with the gas to form a Stokes beam of a typically higher wavelength, and removing the Stokes beam from the core of the fiber.

7 Claims, 2 Drawing Sheets

U.S. PATENT DOCUMENTS

| | | | |
|---|---|---|---|
| 2003/0213267 A1 | 11/2003 | Mossadegh et al. | 65/389 |
| 2004/0266605 A1 | 12/2004 | Villalobos et al. | 501/108 |
| 2005/0025965 A1 | 2/2005 | Sanghera et al. | 428/364 |
| 2005/0105867 A1 | 5/2005 | Koch et al. | 385/125 |
| 2005/0159289 A1 | 7/2005 | Bayya et al. | 501/42 |
| 2005/0185907 A1* | 8/2005 | Byren et al. | 385/125 |
| 2005/0213615 A1* | 9/2005 | Hirth et al. | 372/4 |
| 2005/0229636 A1 | 10/2005 | Nguyen et al. | 65/33.1 |
| 2006/0083470 A1* | 4/2006 | Solarz | 385/125 |
| 2006/0193583 A1 | 8/2006 | Dong et al. | 385/127 |
| 2007/0089462 A1* | 4/2007 | Farroni et al. | 65/385 |

OTHER PUBLICATIONS

Benabid, F., Bouwmans, G., Couny, F., Knight, J.C.; Russell, P.ST.J.; "Rotational SRS in hydrogen gas filled hollow-core PCF with 3 nJ threshold and 92% conversion efficiency", Proceedings, Conference on Lasers and Electro-Optics, 2004. vol. 2, pp. 16-21.

Benabid, F., Knight, J.C., Antonopoulos, G., Russell, P. ST.J., "Stimulated Raman Scattering in Hydrogen-Filled Hollow-Core Photonic Crystal Fiber", Science, vol. 298, Oct. 11, 2002, pp. 399-402.

Berry, A.J., Hanna, D.C., Hearn, D.B., "Low threshold operation of a waveguide H2 Raman laser", Optics Communications, vol. 43, No. 3, pp. 229-232, 1982.

Gregor, E., Mordaunt, D.W., Strahm, K.V., "Greater Than 90% Conversion Efficiency By Stimulated Rotational Raman Scattering In Hydrogen (H2)", Digest, Nonlinear Optics: Materials, Phenomena and Devices, 1990, TP1, pp. 90-91.

Hartig, W., Schmidt, W., "A broadly tunable IR waveguide, Raman laser pumped by dye laser" Appl. Phys. vol. 18, pp. 235-241, 1979.

Heuer, W.; Zacharias, H., "Stimulated Raman effect and four-wave mixing in a hollow waveguide", IEEE Journal of Quantum Electronics, vol. 24, No. 10, pp. 2087-2100, 1988.

Kuyanov, K.E., Momose, T., Vilesov, A.F., "Solid Hydrogen Raman Shifter for the Mid-Infrared Range (4.4-8 μm)", Applied Optics, vol. 43, Issue 32, p. 6023-6029 (Nov. 2004).

Mannik, L., Brown, S.K., "Tunable infrared generation using third Stokes output from a waveguide Raman shifter", Optics Communications, vol, 57, No. 5, pp. 360-364, 1986.

Schrotter, H.W., Klockner, H.W., "Raman scattering cross sections in gases and liquids" in Raman Spectroscopy of Gases and Liquids, Ed. A. Weber, Springer-Verlag, New York, 1979, pp. 123-164.

Shaw, L.B.,. Sanghera, J. S, Aggarwal, I.D., Hung, F.H., "As-S and As-Se based photonic band gap fiber for IR laser transmission", Optics Express, vol. 11, No. 25, pp. 3455-3460, Dec. 2003.

Strahm, K.V., Mordaunt, D.W., Gregor, E., "Nd:YAG laser extended to greater than 2 microns by stimulated Raman scattering", OSA Proceedings on Advanced Solid-State Lasers, Optical Society of America, vol. 10, p. 339-343, 1991.

Rabinowitz, P., Kaldor, A., Brickman, R. Schmidt, W., "Waveguide H2 Raman laser", Applied Optics, vol. 15, No. 9, pp. 2005-2006, 1978.

Thielen, P.A., Shaw, L.B., Sanghera, J.S., Aggarwal, I.D., "Modeling of a mid-IR chalcogenide fiber Raman laser", Optics Express, vol. 11, No. 24, Dec. 1, 2003, pp. 3248-3253.

* cited by examiner

GAS FILLED HOLLOW CORE CHALCOGENIDE PHOTONIC BANDGAP FIBER RAMAN DEVICE AND METHOD

CROSS REFERENCE TO RELATED APPLICATIONS

This application is a divisional of and claims priority from U.S. patent application Ser. No. 11/122,203, filed in the United States on May 3, 2005, the entire disclosure of which is incorporated herein by reference.

BACKGROUND

1. Technical Field

This invention is related to optical fibers, and more particularly, describes a gas filled hollow core chalcogenide photonic bandgap fiber and its use.

2. Description of Related Technology

In the Raman method, a photon interacts with a molecule and excites the molecule to a higher energy vibrational state. In the process, the incident photon loses energy and is converted to a lower frequency photon. Normally, this process converts a small fraction of the incident photons of the pump to lower frequency photons. The generated lower frequency photons are the Stokes wave. In stimulated Raman scattering, however, the Stokes wave is of high enough intensity to stimulate the scattering of other photons, resulting in the conversion of a large fraction of the pump beam to the Stokes beam. The frequency shift of the pump beam is dependent upon the vibrational or rotational modes of the molecules comprising the media.

Raman conversion in highly nonlinear gasses, such as hydrogen, is a well known technique for generation of light in the mid-infrared. In this technique, a high peak power pump beam is focused down into a Raman active gas, usually contained in a large gas cell. The pump beam is Stokes shifted by the gas to generate the mid-infrared light. Very efficient conversion of near-infrared to mid-infrared light has been seen, however, the short interaction lengths in the bulky gas cells require high peak power sources for efficient conversion.

Raman conversion in gas filled hollow dielectric waveguides has also been demonstrated. Here, the dielectric waveguides increase the interaction lengths and thus higher efficiency and lower thresholds are possible than in the free-space gas cell methods. Note, however, that very high peak powers, in the kilowatts, are still necessary to reach threshold due to the large mode area, poor mode quality, and high losses of the dielectric waveguides.

Recently, Raman conversion in gas filled hollow core silica photonic bandgap glass has been demonstrated in the visible spectrum. Here, a silica photonic bandgap structure was filled with hydrogen gas and a pump beam at 532 nm was focused into the gas filled silica photonic bandgap fiber and both the Stokes wave at 682 nm and anti-Stokes wave at 435.2 nm were observed. Due to the small mode area, good mode quality and relatively low losses, thresholds of about 933 watts peak power were seen.

At least two issues limit the applicability of silica-based photonic bandgap fibers in the infrared. First, the silica glass matrix of the photonic bandgap fiber is highly absorbing in the infrared beyond about 2 microns. In an ideal photonic bandgap structure with an infinite number of hole layers, the propagating modes can be contained entirely in the air defect region. Practically, however, the finite number of hole layers, variations in hole periodicity and deformation of the air hole size and shape results in penetration of the mode field into the cladding. This can result in significant loss for signals at wavelengths that are highly absorbed by the photonic bandgap glass matrix, and thus efficient Stokes conversion beyond the transmission window of silica is not possible. Note, too, that propagation of high power pump or Stokes wave at these wavelengths can lead to heating and damage of the fiber.

Second, for commercially available silica photonic bandgap fiber, there exists a single large bandgap which is used for propagation. While the bandwidth of this gap is large, it would not be large enough to allow a single Stokes shift of a near infrared pump from 1-2 microns to the mid-infrared. This limits the applicability of silica-based gas filled hollow core bandgap fiber for infrared Raman lasers and the like.

Until recently, it was not known whether infrared transmissive materials, such as chalcogenide glass, could be fabricated into photonic bandgap fiber and whether the structures would demonstrate bandgaps that could be used for guidance in the infrared. In fact, recently it was shown that guidance in the infrared is possible in As—S and As—Se based photonic bandgap structures. The high transparency of the As—S and As—Se glasses in the infrared allows very low loss air core propagation of infrared light. Furthermore, in some structures there exist several widely space bandgaps which can be used for pump and Stokes wave propagation. Through careful design of these with appropriate transmission bands and choosing suitable Raman active gases, hollow core photonic bandgap Raman lasers in the infrared are feasible.

It is an object of this invention to use a gas in a hollow chalcogenide glass fiber to convert an optical signal and thus exploit the much higher Stokes shift of a gas compared to that of a solid.

It is another object of this invention to attain the desired Stokes shift.

It is another object of this invention to attain a higher gain coefficient and thus attain a greater amplification.

It is another object of this invention to attain a desired Stokes shift cheaper and more simply using a gas filled hollow glass fiber.

It is another object of this invention to amplify light in the wavelength region of about 1-15 microns using a hollow core and gas filled chalcogenide glass fiber.

These and other objects can be attained by achieving high efficiency Raman fiber lasers and amplifiers in the spectrum region of about 1-15 microns by using stimulated Raman scattering in a gas filled hollow core infrared transmissive chalcogenide photonic bandgap glass fiber or structure to frequency shift a shorter wavelength pump beam to a longer Stokes beam. The use of a highly nonlinear glass, such as chalcogenide, in the infrared transmissive photonic bandgap fibers for Raman devices not only allows high efficiency Raman conversion due to the high Raman cross-section of the gasses but enables high average power sources in wavelength regions unreachable by current devices. By choosing a suitable pump wavelength, Raman devices can be utilized to generate or amplify light in the wavelength region of about 1-15 microns, which includes the fingerprint region.

DETAILED DESCRIPTION OF EMBODIMENTS OF THE INVENTION

Figure 1:
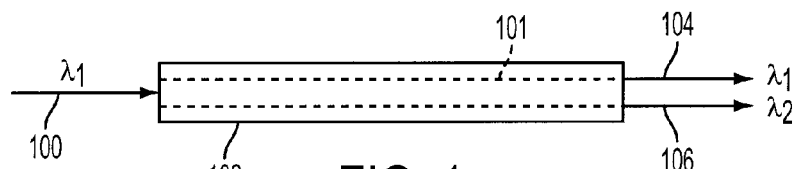
FIG. 1 is a sketch illustrating the conceptual use of stimulated Raman scattering (SRS) in a chalcogenide glass fiber to frequency shift a shorter wavelength pump beam to a longer wavelength Stokes beam.

This invention is directed to an optical fiber, a Raman device and to a method of using the device. The fiber device is characterized by a hollow or channel gas-filled chalcogenide glass photonic bandgap fiber and the method is for amplifying a light beam by passing a light beam into the fiber wherein it interacts with the gas in the fiber channel by means of stimulated Raman scattering which imparts intensity and other attributes thereto before exiting the fiber.

For certain applications, such as infrared countermeasures and LIDAR, it may be desirable to shift, for example, wavelength of a light beam, to a higher value. For other applications, it may be desirable to shift a wavelength to a lower value. The shift can be from 1.064 μm to 1.91 μm or one from 2.0 μm to 11.8 μm, or anything in between or beyond, and should be accomplished in as few shifts as possible. For instance, with a solid arsenic sulfide glass as the optical medium, it takes 15 shifts to go from 2 μm to 10 μm whereas using a hollow, hydrogen gas filled medium in a chalcogenide glass fiber, the same shift can be attained in one shift in fiber of the same length. On power basis in the example, initial power was about 10 watts and the final power was about 2 watts. A different fiber design, with same or different gas, can be used to control reduction of the wavelength.

The reason for large shifts resides in the fact that Stokes shifts for gases are much larger than for solids. For instance, Stokes shift for hydrogen gas is 4155 cm$^{-1}$ whereas for solid arsenic sulfide it is 270 cm$^{-1}$. Although actual shifts are not proportional to Stokes shifts, they are directly proportional and vary with the Stokes shifts substantially. Given below is Table I which lists Stokes shifts for several gases and the wavelength shift obtained thereby:

TABLE I

| Pump Wavelength | Gas | Stokes Shift (vibrational) | Stokes (output) Wavelength |
|---|---|---|---|
| 1.064 μm | $H_2$ | 4155 cm$^{-1}$ | 1.91 μm |
| 1.5 μm | $H_2$ | 4155 cm$^{-1}$ | 4.0 μm |

TABLE I-continued

| Pump Wavelength | Gas | Stokes Shift (vibrational) | Stokes (output) Wavelength |
|---|---|---|---|
| 1.92 μm | $H_2$ | 4155 cm$^{-1}$ | 9.5 μm |
| 2.0 μm | $H_2$ | 4155 cm$^{-1}$ | 11.8 μm |
| 2.0 μm | $D_2$ | 2989 cm$^{-1}$ | 4.4 μm |
| 2.0 μm | $CH_4$ | 2917 cm$^{-1}$ | 4.8 μm |
| 2.01 μm | HI | 2230 cm$^{-1}$ | 3.63 μm |

Scrutiny of Table I, above, shows corroboration between Stokes shift parameters and the extent of wavelength shift, which holds for hydrogen, deuterium, methane, hydrogen iodide, and other gases that might be used. The pump wavelength given in Table I is obtained from various lasers that may be employed. As shown in Table I, with a pump wavelength of 1.064 μm, the output Stokes wavelength for hydrogen gas was 1.91 μm but increases to 11.8 μm when pump wavelength of 2.0 μm was used. It should be apparent that the gas used in the channel of the fiber dictates the Stokes shift and although gas pressure does not affect the shift, it does affect the shift, it does affect optical gain and provides better and more efficient conversion and interaction between photons and gas molecules. Furthermore, at low pressures, the Stokes shift parameters are rotational whereas at high pressures, they are vibrational. Low pressures herein are on the order of one atmosphere whereas high pressures are on the order of several atmospheres. For purpose of a shift, gas pressure is typically not considered. As is apparent from Table I, above, large wavelength conversions can be realized in one Stokes shift and the optical signal or the pump light can be easily pumped by high power commercial lasers in the range of 1-2 μm wavelengths.

Lasers and amplifiers are principal uses of the gas-filled hollow photonic bandgap chalcogenide glass fibers. FIG. 1 is an illustration of an amplifier based on the fiber. FIG. 1 sketch is a conceptual use of stimulated Raman scattering in a hollow gas-filled chalcogenide glass fiber to frequency shift a shorter wavelength pump beam to a longer wavelength Stokes beam.

FIG. 1 generally illustrates the concept of stimulated Raman scattering in a chalcogenide photonic bandgap glass fiber. Referring to FIG. 1, a light beam 100 at wavelength $\lambda_1$ is launched at one end into hollow core 101 of a glass fiber 102 that produces spontaneous Raman scattering in the fiber. Fiber 102, with a gas filled channel, is a chalcogenide fiber. A light beam 100 goes through the channel of the fiber and issues forth from the other end thereof as light beam 104 at wavelength $\lambda_1$ but at a lower intensity than light beam 100. The depleted light beam 104 at wavelength $\lambda_1$ is depleted due to pump light beam 100 interactions with the gas in the channel 101 of fiber 102. The energy that the light beam 100 loses in its interactions with the gas produces the Raman scattered light that exits the fiber as light beam 106, i.e., the Raman signal which is of higher wavelength $\lambda_2$ than light beam 104 but is typically at a lower intensity.

Figure 2:
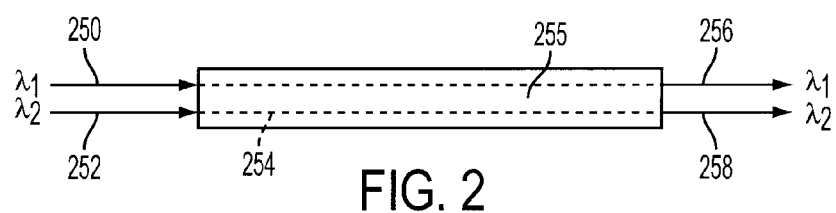
FIG. 2 is a schematic illustration of a portion of an amplifier wherein a pump beam and a signal beam are passed into a hollow, gas-filled chalcogenide glass fiber at one end thereof and a depleted pump light beam and an amplified signal beam are received at the other end of the fiber.

A portion of an amplifier with a different arrangement is illustrated in FIG. 2 where pump light beam 250 of wavelength $\lambda_1$ and signal light beam 252 of wavelength $\lambda_2$ of a lower intensity than the pump light beam 250 are launched into one end of a hollow, gas-filled chalcogenided channel 255 glass fiber 254. Light beam 252 interacts with the gas in channel 255 of fiber 254 through stimulated Raman scattering and is amplified. At the opposite end of the fiber 254, depleted beam 256 at wavelength $\lambda_1$ and amplified light beam 258 at wavelength $\lambda_2$ issue forth.

Figure 3:
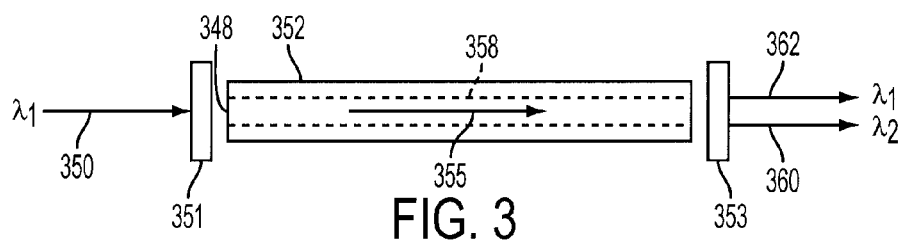
FIG. 3 is a schematic illustration of a fiber laser wherein a pump light beam is passed into one end of a hollow photonic bandgap chalcogenide glass fiber arranged in a cavity structure provided with reflecting means, such as mirrors or gratings, and a depleted pump light beam at a Raman shifted wavelength issue from the opposite end of the fiber.

FIG. 3 is a schematic illustration of a basic laser structure with pump beam 350 at wavelength $\lambda_1$ entering glass fiber 352 with gas filled channel 358. Glass fiber 352 has at both ends thereof either mirrors or gratings, not shown. Passing through the glass fiber in the cavity/channel 358 between gratings or mirrors light beam 350 creates a light beam 355 at wavelength $\lambda_2$ by means of spontaneous Raman scattering. The gratings or mirrors reflect light 355 at wavelength $\lambda_2$ back and forth in cavity 358 and every time the light at wavelength $\lambda_2$ is reflected, it interacts with pump light beam 350 and extracts energy through stimulated Raman scattering and is thus amplified. Reflection by the gratings or mirrors of light 355 in the fiber at wavelength $\lambda_2$ is continued in order to amplify the light at wavelength $\lambda_2$. Since the end grating or mirror is designed so that its reflectivity is not 100%, some light 355 at wavelength $\lambda_2$ in cavity 358 escapes through the end grating or mirror and issues out of fiber 352 as laser light beam 360 at wavelength $\lambda_2$. Light beam 350 at wavelength $\lambda_1$ travels through fiber 352 and gives up most of its energy to light 355 at wavelength $\lambda_2$ and exits the glass fiber as a depleted light beam 362 at wavelength $\lambda_1$.

Figure 4:
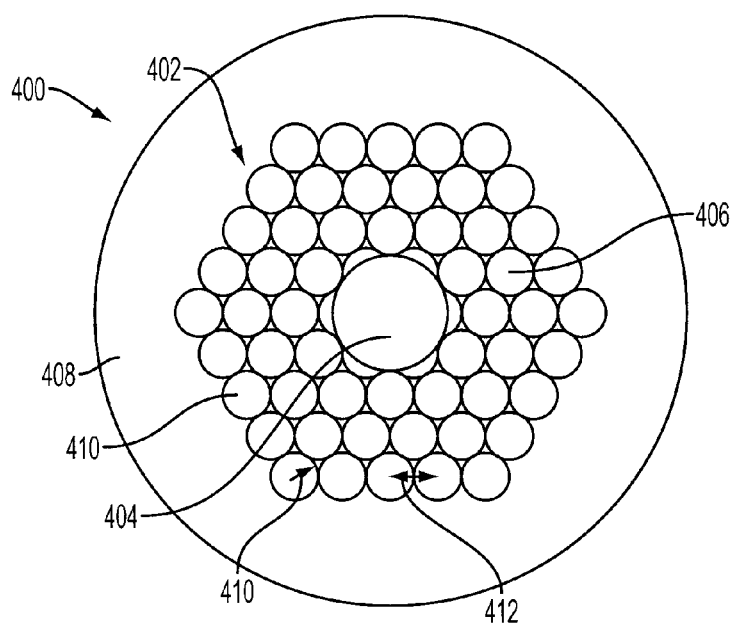
FIG. 4 is an illustration of a cross-section of an arsenic sulfide 90% air fill triangular hole pattern photonic bandgap glass fiber.

An illustration of a cross-section of a typical hollow core photonic band gap infrared fiber is shown in FIG. 4 where the fiber 400 includes hollow core 404, microstructured region in hexagonal or honeycomb or any other shape 404, and circumferential region 406. The fiber is made from a chalcogenide glass. The fiber 400 is typically circular in cross-section although it can be of any other shape and its outside diameter is typically in the range of 80-1000 µm. The hollow core 404 can be hexagonal in cross-sectional shape, circular, or any other shape, although, typically, it is circular. The hollow core diameter is typically from 1 µm to several hundreds of microns, more typically 2-200 µm. Openings or channels or capillaries 406 in the microstructured region 402 are typically circular in cross-section although they can be of any other shape. The diameter of the openings is typically from a fraction of a micron to about 10 µm in diameter with a center-to-center spacing or periodicity of 1-12 µm. In the microstructured region of the fiber, the air fill fraction should be 30-99%, preferably 40-70%. The purpose of the openings is to create the photonic band gap which channels light into the hollow core. In absence of the microstructured region, which imparts photonic band gap to the fiber, the light passing through the hollow core would be scattered or lost and the fiber would not be functional for the intended purpose. It is believed that at least three courses (i.e., layers) of the openings should be disposed around the center hollow core 404 to create the photonic band. The arrangement of the openings can be in hexagonal or honeycomb structure or in any other periodic or non-periodic way that produces the desired photonic band gap. Openings 406 are typically arranged in hexagonal pattern and typically there are 4-5 courses of the openings in the microstructured region 402 disposed concentrically around the hollow core 404, although there may be fewer than four or more than four courses.

Thickness of the solid region 408 is typically 5-500 µm, and more typically 50-300 µm, although it will depend on the glass composition and other parameters to provide physical integrity to the microstructured region 402. Thickness of the microstructured region is 5-500 µm, preferably 20-300 µm.

Chalcogenide glass is a vitreous material composed of the chalcogen elements of Group VI of the Periodic Table. These elements are usually mixed with elements of Groups IV and V to form the familiar compound glasses. More particularly, chalcogenide glasses are made from mixtures containing at least one of sulfur, selenium, and tellurium. Other elements can be added. Examples of other elements that can be combined with at least one chalcogen element include germanium, arsenic, and antimony.

Chalcogenide glass typically contains at least about 25 mole percent, and generally at least 50 mole percent, of one or more of the three chalcogen elements. The presence of tellurium in the glass composition has been found to increase the transmission in the infrared region. While sulphide fibers, such as $As_2S_3$, transmit from about 1-6 µm, the transmission window can be increased to beyond 10 µm by including the heavier chalcogenide element tellurium. Glasses containing high levels of tellurium typically transmit in the 3-12 µm region.

The use of chalcogenide fibers is advantageous not only for wide transmittance range but also for chemical durability. Although chalcogenide glass cannot be used in strongly basic environments because it undergoes chemical attack, there are numerous environments where chalcogenide fibers can be used. For instance, chalcogenide glass does not react with water, unlike fluoride glass, and can, therefore, be used in aqueous non-basic environments. Additionally, chalcogenide glass can be used in acidic and organic environments.

The fiber of this invention can also be made from mixtures of halide and chalcogenide glass components. Halide glasses, such as ZBLAN (53 $ZrF_6$-20 $BaF_2$-4 $LaF_3$-3 $AlF_3$-20 NaF by mole percent) with more than about 5% of a halide, such as bromine or fluorine, have relatively poor chemical durability and low glass transition temperatures, especially the non-fluoride glasses, whereas chalcogenide glasses are well known for their chemical durability but their relatively high refractive indices give rise to high reflectivities from the glass surface. Chalcohalides contain both halides and chalcogens and have some beneficial characteristics of both glasses. The structural aspect of these glasses is interesting from a fundamental viewpoint since chalcogenide glasses are predominantly covalent and halide glasses are predominantly ionic in character. As used herein, the term "chalcogenide" includes "chalcohalide."

The photonic band gap hollow fibers of this invention can have a polymeric material cladding, or a cladding of any other material, on the outside of the fiber, although such cladding is not required. The cladding is provided on the fiber to facilitate handling thereof. The cladding material can be hydrophobic or hydrophilic, typically it is hydrophobic for obvious reasons. Some hydrophobic polymeric materials in an aqueous environment containing a hydrophobic analyte will repel water but will preferably solubilize the hydrophobic analyte. Specific examples of the polymeric materials include low density polyethylene and polydimethylsiloxane. There are other polymeric materials which do not allow species to penetrate them.

The periodic layered structure of holes and glass in the microstructured region of the hollow core fiber of this invention, shown in cross-section in FIG. 4, creates a photonic band gap that prevents light from propagating in the microstructured region, analogous to a 2 D grating, and so light is confined to the hollow core. Typically, the periodicity of the holes is on the scale of the wavelength of light and the outer glass or the circumferential glass region is used for providing mechanical integrity to the fiber. The fact that light travels in the hollow core also means that the losses will be lower so longer path lengths can be used. Since light is guided in the hollow core, gas disposed therein will have maximum interaction with light, unlike the prior art evanescent sensors.

Material of the fiber is considered to be crucial since there is no way to predict that what works with one material, will work in another. It has been found that the chalcogenide glass fibers work successfully here. Silica fibers have limitations in that silica absorbs light beyond about 1.5 µm whereas chalcogenide fibers do not have such limitation and transmit light in the fingerprint region and up to about 15 µm. Typically, transmission range of chalcogenide glass is in the region of about 1-15 µm, which includes the visible spectra of 400 to 700 µm.

Figure 5:
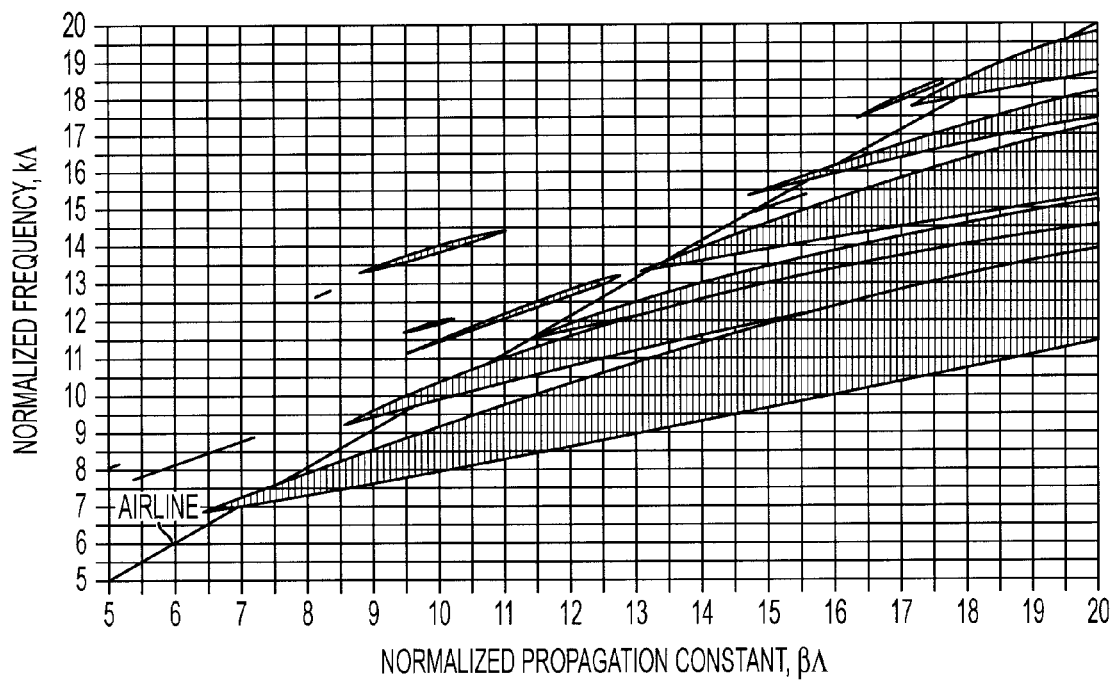
FIG. 5 is a plot of normalized frequency on the y-axis and normalized propagation constant on the x-axis and shows transmission windows for various light signals.

FIG. 5 is a plot of normalized frequency in kΛ and the normalized propagation constant βΛ. Since k=2π/λ, this plot can be used to determine if a particular wavelength is functional in this environment. The 45° air line and the intersecting bandgap areas denote optical transmission windows for a chalcogenide glass fiber material. In designing a fiber for a system, one has to determine if pump wavelength and output Stokes wavelength are transmissive since if one or the other is not, it means that confinement of that particular optical signal has been lost and Stokes shifting cannot be carried out. The plot is specific for the arsenic sulfide 90% air fill microstructured triangular hole pattern photonic bandgap chalcogenide glass fiber of FIG. 4. Efficiency of fiber design can be verified by ascertaining that the pump wavelength and the Stokes wavelength is within one or more of the transmission windows in FIG. 5.

Figure 6:
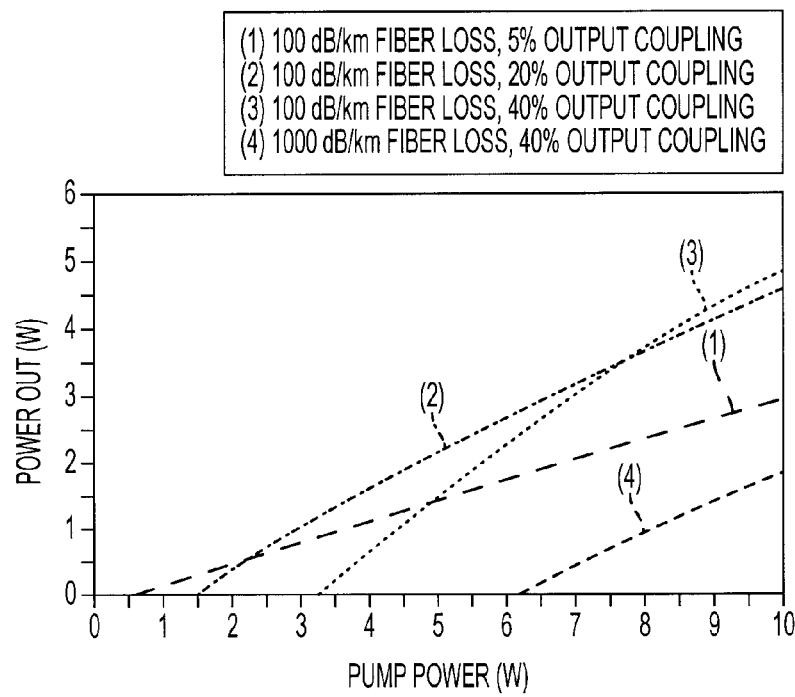
FIG. 6 is a plot of output power and pump power for three hollow photonic bandgap arsenic sulfide fibers filled with hydrogen gas showing efficiency for different loss fibers at outputs in the range of 5-40%.

FIG. 6 is a plot of Power Out and Pump Power for a number of different arsenic sulfide hollow core, hydrogen iodide gas filled photonic bandgap glass fiber at various output couplings. This plot can be used to determine conversion power efficiency. For instance, the (3) plot in FIG. 6 shows the output power for a pump power of 10 Watts, using an arsenic selenide glass fiber with a 40% output coupling. The output power is about 5.5 Watts, with an efficiency of about 55%.

Raman lasers are important sources of radiation, especially in the mid-infrared and long-wave infrared regions. Current technology relies on optical parametric oscillators (OPOs) which are technically complex and bulky and a few solid state lasers which are limited in wavelength coverage. Diode lasers are being developed, however, to date, they are low power and require cryogenic cooling. The Raman fiber lasers offer the advantage of a simple, compact, room temperature source of radiation that can access any wavelength within the transmission band of the As—S, As—Se or any other chalcogenide glass fiber, typically in the range of 1-15 µm, with a suitable pump. The photonic bandgap fibers are not limited to any particular chalcogenide glass but can be made of telluride glass which transmit even further in the infrared region. Furthermore, the fibers can be made from mixtures of chalcogenides as well as chalcohalide glasses.

The fiber lasers of this invention also offer an advantage not seen on other Raman lasers, including gas-cell Raman lasers, gas-filled dielectric waveguide or capillary Raman waveguide lasers or silica based solid core fiber Raman lasers. The gas filled hollow core photonic bandgap lasers effectively suppress conversion to higher order Stokes and anti-Stokes wavelengths which can compete with the Stokes process. This is due to the fact that the photonic bandgap fibers are designed to operate only at the pump and Stokes wavelength. Higher order Stokes or anti-Stokes wavelengths are not guided in the cavity and thus do not experience gain. Rotational Raman shifts would also be suppressed as well as other undesired vibrational Stokes shifts.

Other advantage of the gas filled hollow core photonic bandgap fiber Raman lasers of this invention include the compact size and high efficiency of the lasers. Raman active gasses have very high Raman cross-sections and thus gain is very high in these lasers allowing short fiber lengths to be used. Very high output power and slope efficiencies can be obtained in only 1 meter of the fiber. By contrast, silica solid core Raman fiber lasers requires hundreds of meters of fiber to achieve high efficiencies and high power output.

Other configurations of these gas filled hollow core photonic bandgap Raman fiber lasers include cascaded Raman fiber lasers. In this embodiment, several gas-filled hollow core bandgap fiber lasers are "cascaded" such that the output Stokes wave from one laser is launched into the next laser which generates and amplifies a second Stokes wave at longer wavelength. With this process, the initial pump beam may be shifted up in wavelength through several Stokes shifts to generate a high power beam at much longer wavelengths than the original pump wavelength.

Having described the invention, the following example is given as a particular embodiment thereof and to demonstrate the practice and advantages thereof. It is understood that the example is given by way of illustration and is not intended to limit the specification of the claims in any manner.

EXAMPLE

The use of hydrogen iodide (HI) gas filled arsenic selenide (AsSe) Raman photonic bandgap fiber laser is demonstrated in this example.

The hollow core gas filled Raman laser included a chalcogenide glass photonic bandgap fiber, cross-section of which is shown in FIG. 4, where the structured region 402 is 90% gas-filled with hydrogen iodide, an active Raman gas, contained in the fiber core. The hydrogen iodide was sealed in the arsenic selenide photonic bandgap fiber by silica capillary tubes which were capped with dielectric mirrors coated for appropriate wavelengths—high transmission at pump wavelengths and high reflectivity at the Stokes wavelength at the pump launch end and partial transmission at the Stokes wavelength at the input end. Inside of the hollow core photonic bandgap fiber was evacuated and backfilled with hydrogen iodide gas using the capillary manifold at the output end. Hydrogen iodide gas has vibrational Stokes shift of 2230 $cm^{-1}$ and pump wavelength of 2.01 µm was obtained from a commercial Tm-doped silica fiber laser at output power of greater than 150 watts. The output wavelength, calculated from the Stokes shift of hydrogen iodide gas was 3.63 µm. Note that this wavelength lies within the atmospheric transmission window in the infrared, shown in FIG. 5.

For hollow core photonic bandgap fiber lasers, the fiber must be capable of supporting propagation at both the pump wavelength and the Stokes wavelength. The fiber shown in FIG. 4 is a schematic of an arsenic selenide 90% air fill photonic bandgap structure which was capable of supporting propagation at both the pump wavelength of 2.01 µm and the Stokes wavelength of 3.63 µm. The fiber had a pitch (hole spacing of the microstructured fiber) of Λ=6.07 µm. The fiber was able to support pump propagation in the bandgap crossing the air line at k Λ=19 and Stokes propagation in the bandgap crossing the air line at k Λ=10.5.

Efficiency and threshold of the laser was calculated based upon the model described in prior art. FIG. 6 shows the output power at 3.63 µm versus the input power at 2.01 µm of the hydrogen iodide gas filled arsenic sulfide based hollow core photonic bandgap fiber Raman laser. The mode field of both the pump and the Stokes waves in the fiber was defined by the hollow core size, which was 16 µm in diameter. A one meter length of the fiber was used that had a loss of 100 dB/km in one and a loss of 1000 dB/km in the other. Very high conversion with low threshold was achieved with reasonable output couplings. For an output of 40%, a slope efficiency of 56% was achieved with a threshold of 3.2 watts. For 10 watts of power into the fiber, 4.8 watts output was attained.

While presently preferred embodiments have been shown of the novel optical device and method for using same, and of the several modifications discussed, persons skilled in this art will readily appreciate that various additional changes and modifications may be made without departing from the spirit of the invention as defined and differentiated by the following claims.

What is claimed is:

1. A method for shifting a beam wavelength comprising:
  introducing the beam into a hollow core chalcogenide photonic bandgap glass fiber having a Raman active gas disposed in the core, the gas comprising at least one of hydrogen, deuterium, methane, hydrogen iodide, and mixtures thereof;
  conveying the beam through the core while it interacts with the gas to produce a Stokes beam of a different wavelength;
  and removing the Stokes beam from the core of the fiber, wherein the hollow core chalcogenide photonic bandgap glass fiber includes a microstructured region disposed around said core and a solid region disposed around said microstructured region for providing structural integrity to said microstructured region,
  said microstructured region comprising a plurality of openings having a center to center distance such as to yield at least one photonic band gap in the infrared region beyond about 2 μm wavelength.

2. The method according to claim 1, wherein the openings are disposed from each other a distance in the approximate range of 1-12 μm.

3. The method of claim 1, wherein said fiber is circular in cross-section and elongated and said microstructured region is 20-300 μm thick and has an air fill fraction of 30-99%.

4. The method of claim 1, wherein said core is circular in cross-section and has diameter of 2-200 μm, thickness of said solid region is 5-500 μm, there are at least four courses of said openings in said microstructured region around said hollow core and said openings are 1-10 μm in diameter.

5. The method of claim 4, wherein said openings are 1-5 μm in diameter and said gas is selected from the group consisting of hydrogen, deuterium, methane, hydrogen iodide, and mixtures thereof.

6. The method of claim 5, wherein said solid region is a circumferential region around and in contact with said microstructured region and said microstructured region has an air fill fraction of 40-70%.

7. A method for shifting a beam wavelength comprising:
  introducing the beam into a hollow core chalcogenide photonic bandgap glass fiber having a Raman active gas disposed in the core, the gas comprising at least one of hydrogen, deuterium, methane, hydrogen iodide, and mixtures thereof;
  conveying the beam through the core while it interacts with the gas to produce a Stokes beam of a different wavelength;
  and removing the Stokes beam from the core of the fiber, wherein the hollow core chalcogenide photonic bandgap glass fiber includes a microstructured region disposed around said core and a solid region disposed around said microstructured region for providing structural integrity to said microstructured region,
  said microstructured region comprises a plurality of openings having a center to center distance such as to yield a photonic band gap at the beam wavelength and at the Stokes beam wavelength.

* * * * *